W. D. JAMES.
CARRIER.
APPLICATION FILED NOV. 16, 1911.
1,055,399.
Patented Mar. 11, 1913.
3 SHEETS—SHEET 1.
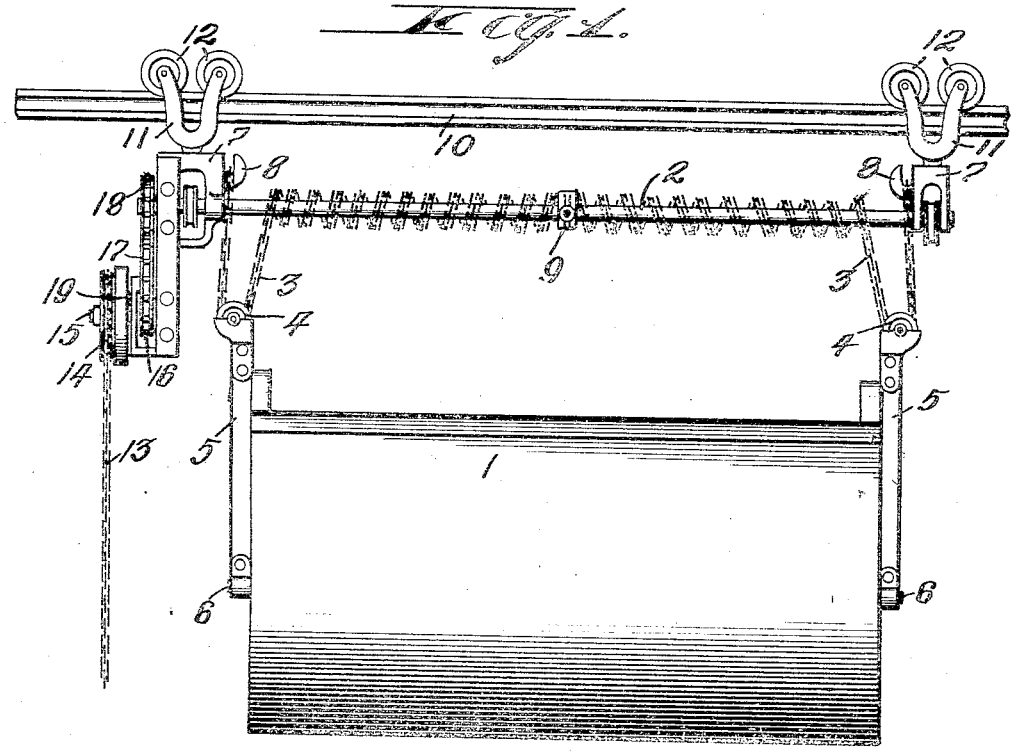
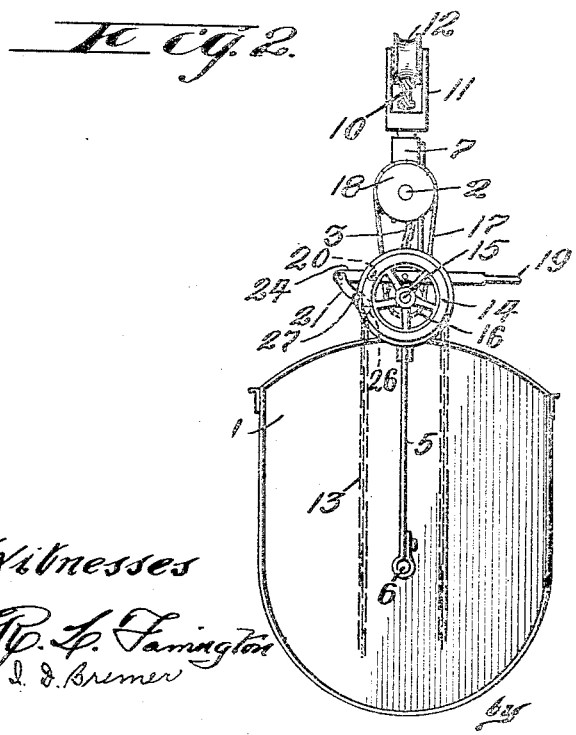
Witnesses
Inventor:
William D. James W. D. JAMES.
CARRIER.
APPLICATION FILED NOV. 16, 1911.
1,055,399.
Patented Mar. 11, 1913.
3 SHEETS—SHEET 2.
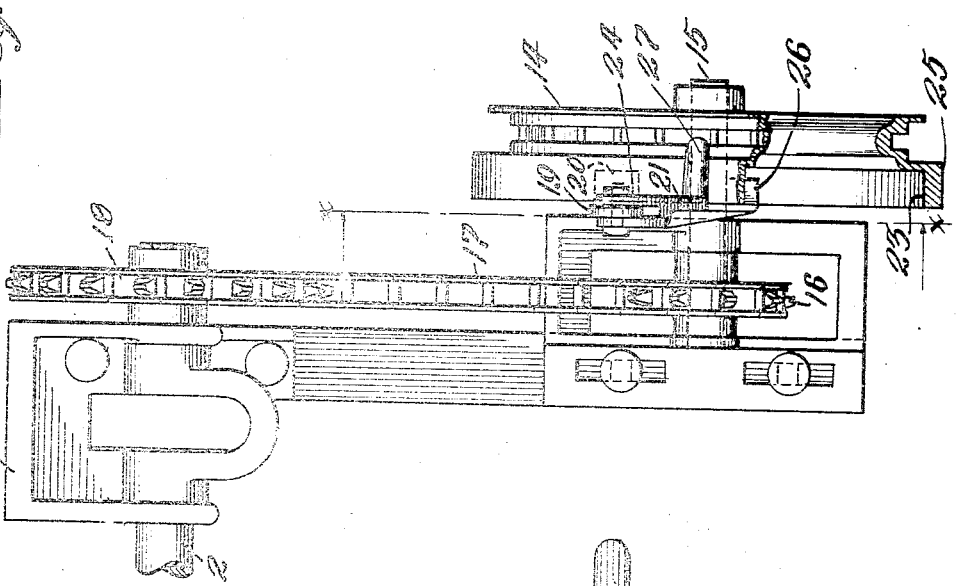
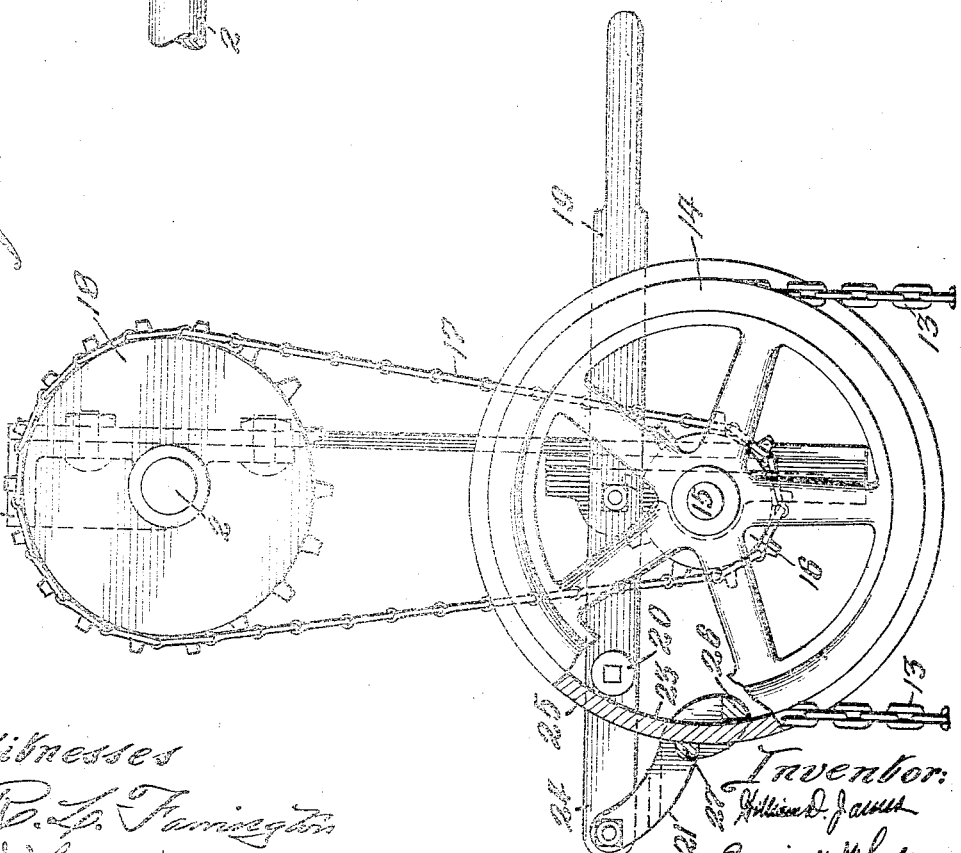

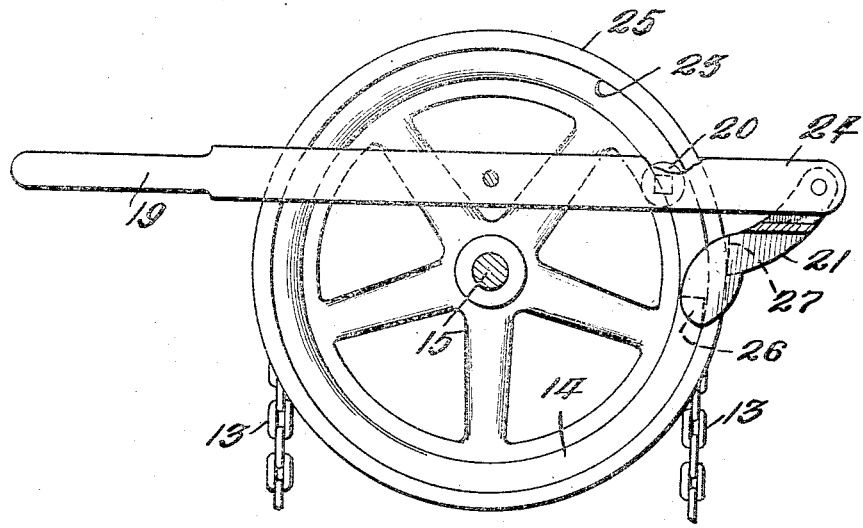
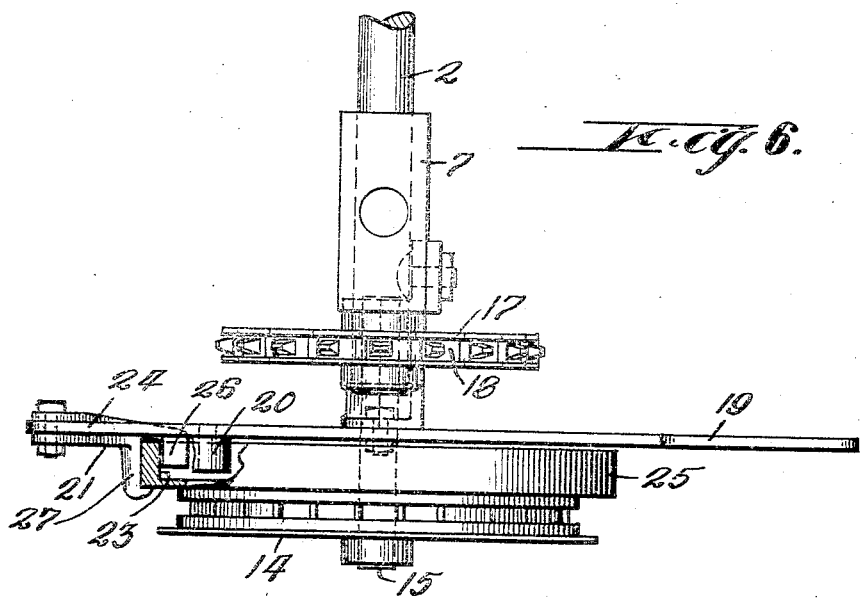

UNITED STATES PATENT OFFICE.

WILLIAM D. JAMES, OF FORT ATKINSON, WISCONSIN.

CARRIER.

1,055,399.

Specification of Letters Patent.

Patented Mar. 11, 1913.

Application filed November 16, 1911. Serial No. 660,604.

*To all whom it may concern:*

Be it known that I, WILLIAM D. JAMES, a citizen of the United States, residing at Fort Atkinson, county of Jefferson, and State of Wisconsin, have invented new and useful Improvements in Carriers, of which the following is a specification.

My invention relates to improvements in that class of carriers which are movably suspended from a track, and the receptacle is adapted to be lowered preparatory to being filled, and when filled, is raised preparatory to being moved along the track to the place where its contents are deposited, and the same pertains more especially, among other things,—1st, to the device for locking and retaining the litter receptacle at any desired point of adjustment between the ground and the supporting track; and 2nd, to the brake mechanism by which the movement of the receptacle is retarded as it is being lowered.

My invention is further explained by reference to the accompanying drawings, in which—

Figure 1 represents a side view, and Fig. 2 an end view of my carrier as it appears when suspended from a track. Fig. 3 represents an enlarged end view, and Fig. 4 a side view of the upper portion of the carrier, showing the locking mechanism for supporting the litter receptacle and the friction brake by which the downward movement of such receptacle is retarded after the locking mechanism has been released, parts of said views being broken away to better show the construction. Fig. 5 represents a side view of the brake wheel and locking mechanism by which the movement of the receptacle is controlled, said view representing the opposite side from that shown in Fig. 3, and Fig. 6 represents a top view of the device shown in Fig. 5, in connection with the supporting shaft and sprocket wheel by which motion is communicated to said supporting shaft.

Like parts are identified by the same reference numerals throughout the several views.

1 represents the litter receptacle which is suspended from a winding shaft 2 through the chain 3, pulleys 4, 4, hangers 5, 5, and pivotal bolts 6, 6, by which bolts said hangers are pivotally connected with the respective ends of said receptacle. The chain 3 is connected at its respective ends with the swiveled blocks 7, through the hooks 8, when it passes from thence down and beneath the pulleys 4, thence up and around the shaft 2, and is then connected near its center to the center of the shaft 2 by the clamping member 9. The swiveled blocks 7 are respectively connected with the track 10 by the hangers 11, and pulleys 12.

13 is an endless operating chain. Motion is communicated from the endless chain 13 to the shaft 2 through the brake wheel 14, shaft 15, sprocket wheel 16, sprocket chain 17, and sprocket wheel 18, said endless chain 13 being moved in one direction when raising the receptacle 1, and in the opposite direction as said receptacle is lowered of its own gravity.

The device thus far described is substantially of ordinary construction, and invention herein is predicated more especially— 1st, upon the brake mechanism for retarding the downward movement of the receptacle when the same is released from the clutch mechanism, and 2nd, upon the device for retaining the receptacle 1, together with its load, either in its elevated position, or at any intermediate point between its extreme upper and lower positions, consisting in the operating lever 19, brake member 20, clamping lever 21, means for pivotally supporting said lever 19 eccentric to the brake wheel 14, means for rigidly securing the brake member 20 to said lever 19, and means for pivotally connecting the clamping lever to said operating lever 19, whereby, as the free end of said lever 19 is moved downwardly, the clutch lugs on said clamping lever 21 are disengaged from the rim 25 of the brake wheel 14, when the brake member 20 is brought firmly against the inner opposing surface 23 of said wheel, whereby the revoluble movement of said wheel and the downward movement of the receptacle 1 are retarded, and whereby the receptacle 1 is permitted to move downwardly more or less rapidly, according to the pressure upon the free end of said lever 19. When, however the free end of the lever 19 is released from the hand of the operator, the opposite end 24 of said lever is permitted to move downwardly of its own gravity, whereby the rim 25 of said wheel 14 is clutched between the opposing lugs 26 and 27, and whereby the revolving movement of said wheel 14 is stopped the instant the lever 19 is thus released. Thus it will be obvious that by the same downward movement of the free end of said operating lever which releases the clutch lugs from the flange 25, the brake member 20 is brought in contact with the inner surface of said flange and thereby simultaneously retards the revoluble movement of said wheel 14 and the downward movement of the receptacle.

While my invention is adapted to be used as a litter carrier, it will be understood that the same is equally adapted to be used for handling iron, coal, stone, and a great variety of other materials.

Having thus described my invention, what I claim as new, and desire to secure by Letters Patent, is—

1. In a litter carrier, a device for stopping the movement of the litter receptacle when loaded, consisting in the combination of a brake wheel provided with a projecting flange, means for manually revolving said wheel, means for communicating a revoluble movement from said brake wheel to a winding shaft from which said receptacle is suspended, an operating lever, means for pivotally supporting said operating lever eccentrically to said brake wheel, a clamping lever pivotally connected at one end to said operating lever and provided at its opposite end with a pair of gripping lugs, said lugs being adapted to grip the respective sides of the flange of said wheel and thereby stop the revoluble movement of said wheel the instant said operating lever is released from the hand of the operator.

2. In a litter carrier, a device for retarding and stopping the movement of the litter receptacle when loaded, consisting in the combination of a brake wheel provided with a projecting flange, means for manually revolving said wheel, means for communicating a revoluble movement from said brake wheel to a winding shaft from which said receptacle is suspended, an operating lever, means for pivotally supporting said operating lever eccentrically to said brake wheel, a clamping lever pivotally connected at one end to said operating lever and provided at its opposite end with a pair of gripping lugs, said lugs being adapted to grip the respective sides of the flange of said wheel, and a brake member connected with said operating lever, said brake member being adapted to be brought into contact with said brake wheel as said gripping lugs are released from engagement with said laterally projecting flange, whereby as said wheel is released from said gripping lugs, the downward movement of said receptacle will be retarded.

In testimony whereof I affix my signature in the presence of two witnesses.

WILLIAM D. JAMES.

Witnesses:
MARTHA URBAN,
KATHRYN L. SMITH.

Copies of this patent may be obtained for five cents each, by addressing the "Commissioner of Patents, Washington, D. C."